US012247703B2

(12) United States Patent
Lugaro

(10) Patent No.: US 12,247,703 B2
(45) Date of Patent: Mar. 11, 2025

(54) ANTI-FIRE SAFETY SYSTEM FOR A VEHICLE HAVING HYDROGEN STORED ON BOARD, AND RELATED VEHICLE

(71) Applicant: ALSTOM Holdings, Saint-Ouen-sur-Seine (FR)

(72) Inventor: Luigi Lugaro, Cuneo (IT)

(73) Assignee: ALSTOM Holdings, Saint-Ouen-sur-Seine (FR)

(*) Notice: Subject to any disclaimer, the term of this patent is extended or adjusted under 35 U.S.C. 154(b) by 921 days.

(21) Appl. No.: 17/228,206

(22) Filed: Apr. 12, 2021

(65) Prior Publication Data
US 2021/0325002 A1    Oct. 21, 2021

(30) Foreign Application Priority Data

Apr. 15, 2020   (EP) .................................... 20315172

(51) Int. Cl.
*F17C 13/12*    (2006.01)
*A62C 2/04*    (2006.01)
*A62C 3/07*    (2006.01)

(52) U.S. Cl.
CPC .............. *F17C 13/123* (2013.01); *A62C 2/04* (2013.01); *A62C 3/07* (2013.01); *F17C 2205/0332* (2013.01); *F17C 2221/012* (2013.01); *F17C 2250/036* (2013.01); *F17C 2250/0478* (2013.01); *F17C 2260/042* (2013.01); *F17C 2270/0173* (2013.01); *F17C 2270/0178* (2013.01)

(58) Field of Classification Search
CPC ............ F17C 13/123; F17C 2205/0332; F17C 2221/012; F17C 2250/036; F17C 2250/0478; F17C 2260/042; F17C 2270/0173; F17C 2270/0178; A62C 2/04; A62C 3/07
See application file for complete search history.

(56) References Cited

U.S. PATENT DOCUMENTS 6,178,991 B1 *   1/2001   Schiwek ................ B65D 81/02
                                                    220/88.1
7,501,008 B2 *   3/2009   Eshraghi ............... H01M 8/002
                                                    95/55
(Continued)

FOREIGN PATENT DOCUMENTS

CN          109860671 A      6/2019
DE        112012001789 T5     1/2014
(Continued)

*Primary Examiner* — Toan C To
(74) *Attorney, Agent, or Firm* — Knobbe, Martens, Olson & Bear, LLP

(57) ABSTRACT

An anti-fire safety system for a transport vehicle has one or more storage tanks storing hydrogen. The system includes a first hydrogen-releasing system, which is configured to release outside the vehicle hydrogen contained in at least one of the storage tanks. The system also includes a second release system, which is arranged to intervene and bypass the first hydrogen release system under predetermined operative conditions. The second release system is configured to transform by a chemical reaction, at least a part of the bypassed hydrogen flowing outward from at least one storage tank, into at least one different substance.

16 Claims, 2 Drawing Sheets

(56) References Cited

U.S. PATENT DOCUMENTS

| | | | |
|---|---|---|---|
| 7,901,491 B2 * | 3/2011 | Zhao | B01J 31/24 |
| | | | 429/408 |
| 11,566,715 B1 * | 1/2023 | Ben Sultan | G05D 7/012 |
| 11,674,068 B2 * | 6/2023 | Jo | H05B 1/0247 |
| | | | 423/650 |
| 2007/0128485 A1 * | 6/2007 | Zhao | H01M 8/04037 |
| | | | 429/429 |
| 2007/0227899 A1 * | 10/2007 | McClaine | B01J 8/20 |
| | | | 205/637 |
| 2007/0261734 A1 * | 11/2007 | Maus | F16K 17/383 |
| | | | 137/74 |

FOREIGN PATENT DOCUMENTS

| | | |
|---|---|---|
| DE | 102016209426 A1 | 1/2017 |
| DE | 102017202698 A1 | 8/2018 |
| WO | 2012/143740 A2 | 10/2012 |

* cited by examiner

ANTI-FIRE SAFETY SYSTEM FOR A VEHICLE HAVING HYDROGEN STORED ON BOARD, AND RELATED VEHICLE

CROSS-REFERENCE TO RELATED APPLICATION

This application claims priority to European Patent Application No. 20315172.5 filed on Apr. 15, 2020, the disclosure of which including the specification, the drawings, and the claims is hereby incorporated by reference in its entirety.

FIELD OF THE INVENTION

The present invention relates to an anti-fire safety system for a vehicle having hydrogen stored on board, and to a related vehicle equipped with such an anti-fire safety system.

BACKGROUND OF THE INVENTION

As known, the requirement of safety is of outmost importance in the field of transportation, and this requirement is even more stringent and demanding with transport vehicles storing on board inflammable gases.

In particular, in case of vehicles transporting gaseous hydrogen, or of modern vehicles storing on board compressed gaseous hydrogen to be used as a propeller, such as hydrogen-propelled trains, the onset of a fire on board may result in very dangerous conditions which need to be properly and timely faced.

To this end, vehicles are usually provided with an anti-fire system; in particular, according to a possible solution, each tank storage, containing gaseous hydrogen, is equipped with a thermally activated pressure relief device or "TPRD".

In case of a fire on board of the vehicle, the thermally activated pressure relief device is configured to intervene and prevent the rupture, or even the explosion, of the storage tank due to its internal overpressure.

In practice, when the temperature due to the burning fire achieves a certain level, the pressure relief device has an internal rupture disk which breaks and allows hydrogen to flow outside the storage tank; the outflowing hydrogen is conveyed in a release circuit and then released outside the vehicle.

Such solution is very effective and allows to properly face and mitigate issues related to the presence of fire on board of a vehicle.

However, if the fire laps when a vehicle is passing through a confined space, such as a railway tunnel, or it is resident inside a closed space, such as a parking garage, then such circumstances entail additional safety concerns and issues.

In particular, in such cases, the release of hydrogen jets outside the vehicle into closed or confined spaces, which jets can be even self-ignited when released, can create pressure peaks load and huge peaks of heat release rates especially considering the high volatility of hydrogen.

As a matter of fact, a potentially dangerous atmosphere is created inside the closed or confined space, wherein the risk of more severe consequences is higher compared to fire accidents occurring in the open atmosphere.

Hence, there is still room and desire for further improvements in the way fire events on board of vehicles having hydrogen stored thereon are faced.

SUMMARY OF THE INVENTION

Therefore, a main aim of the present invention is to fulfil at least partially such room and desire, and in particular to provide a solution capable of ameliorating the functioning and effectiveness of fire-fighting systems equipping vehicles having hydrogen stored on board.

Within the scope of this aim, an object of the present invention is to provide in particular an anti-fire system which is capable to properly face and mitigate the consequences of fires lapsing on board of a vehicle, especially when the vehicle is in a closed or confined space.

Yet a further object of the present invention is to provide an anti-fire safety system for a vehicle having hydrogen stored on board, which is highly reliable, relatively easy to realize and at competitive costs.

This aim, these objects and others which will become apparent hereinafter are achieved by an anti-fire safety system for a transport vehicle having hydrogen stored on board, wherein the anti-fire safety system comprises at least:
  a first hydrogen-releasing system which is configured to release outside the vehicle hydrogen contained in at least one of the storage tanks; and
  a second release system which is arranged to intervene and bypass the first hydrogen release system under predetermined operative conditions, wherein the second release system is configured to transform by means of a chemical reaction, at least a part of bypassed hydrogen flowing outward from at least one storage tank, into at least one different substance.

According to some embodiments, the anti-fire safety system according to the invention may comprise one or more of the following features, which may be combined in any technical feasible combination:
  the second release system is configured to release outside the vehicle the at least one different substance obtained through the chemical reaction;
  the second release system is configured to intervene and by-pass, at least temporary, said first hydrogen release system when the vehicle enters into or is inside a closed or confined space;
  the second release system is configured to by-pass, at least temporary, the first hydrogen release system, when the vehicle enters said closed or confined space and a fire alarm is generated on board of vehicle while the vehicle is still within the closed or confined space;
  the second release system is configured to intervene and bypass at least temporary the first hydrogen release system in case of a fire event on board of the vehicle;
  the second release system comprises at least one catalyser suitable to chemically react with and transform at least a part of hydrogen flowing outside the at least one storage tank into said at least one different substance;
  the at least one catalyser is configured to chemically transform at least a part of hydrogen flowing outside the at least one storage tank into water vapour and advantageously controlled burning of mixed flow of hydrogen that react with air flow inside the catalyser;
  the second release system comprises at least a bypass circuit connecting the at least one tank with the at least one catalyser, a by-pass valve positioned along the bypass circuit and a control system which is configured to switch said bypass valve to convey hydrogen flowing outside the at least one storage tank towards the at least one catalyser;
  the second release system comprises at least one buffer tank which is positioned upward the at least one catalyser and is configured to adjust the flow of hydrogen conveyed towards the catalyser;

the second release system comprises a detecting device configured to detect when the vehicle enters or is located inside a closed or confined space;

the detecting device comprises at least one pressure sensor and/or at least one optical sensor;

the second release system comprises at least one steam turbine which is positioned downward the at least one catalyser along a releasing path adapted to be traversed by the flow of the different substance generated via the catalyser;

the second release system comprises a plurality of catalysers which are connected, in parallel among each other, and each to a corresponding storage tank of the one or more storage tanks.

The above aim and objects are also achieved by a transport vehicle comprising one or more storage tanks for storing hydrogen, and an anti-fire system comprising at least:

a first hydrogen-releasing system which is configured to release outside the vehicle hydrogen contained in at least one of the storage tanks; and a second release system which is arranged to intervene and bypass the first hydrogen release system under predetermined operative conditions, wherein the second release system is configured to transform by means of a chemical reaction, at least a part of bypassed hydrogen flowing outward from at least one storage tank, into at least one different substance.

In particular, the transport vehicle is a hydrogen-propelled vehicle.

More in particular, the hydrogen-propelled vehicle is a railway vehicle.

BRIEF DESCRIPTION OF THE DRAWINGS

Further characteristics and advantages will become apparent from the description of some preferred but not exclusive exemplary embodiments of an anti-fire system and related transport vehicle according to the present disclosure, illustrated only by way of non-limitative examples with the accompanying figures wherein.

DETAILED DESCRIPTION OF THE PREFERRED EMBODIMENTS

It should be noted that in order to clearly and concisely describe the present disclosure, the drawings may not necessarily be to scale and certain features of the disclosure may be shown in somewhat schematic form.

Further, when the term "adapted", or "arranged", or "configured", or "shaped", or a similar term is used herein while referring to any component as a whole, or to any part of a component, or to a combination of components, it has to be understood that it means and encompasses correspondingly either the structure, and/or configuration and/or form and/or positioning.

In particular, for electronic and/or software means, each of the above listed terms means and encompasses electronic circuits or parts thereof, as well as stored, embedded or running software codes and/or routines, algorithms, or complete programs, suitably designed for achieving the technical result and/or the functional performances for which such means are devised.

In addition, when the term "substantial" or "substantially" is used herein, it has to be understood as encompassing an actual variation of plus or minus 5% with respect to an indicated reference value or position.

Figure 1:
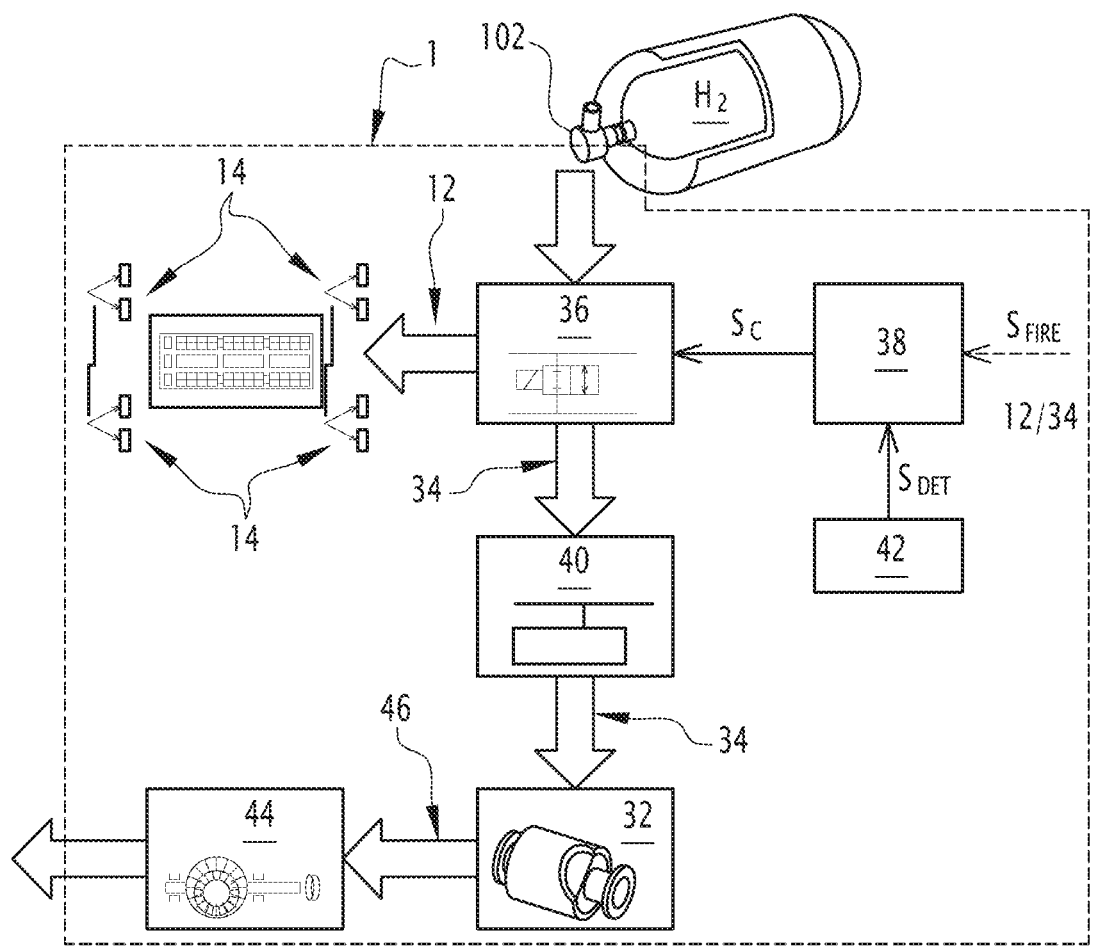
FIG. 1 is a block diagram schematically illustrating an anti-fire safety system according to the present invention.
Figure 2:
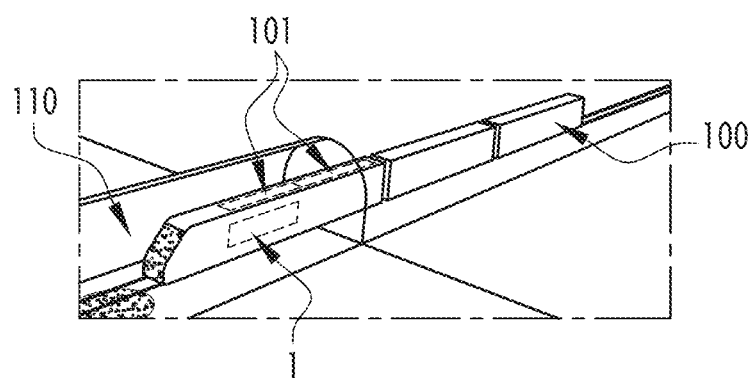
FIG. 2 is a view schematically representing the anti-fire safety system of FIG. 1 used on a hydrogen propelled train which is shown while entering a tunnel.

FIG. 1 illustrates an anti-fire safety system, indicated by the overall reference number 1, suitable for a transport vehicle, for example a hydrogen propelled train schematically represented in FIG. 2 by the reference number 100, which vehicle comprises one or more on-board storage tanks 101 storing hydrogen $H_2$, and in particular compressed gaseous hydrogen $H_2$.

The anti-fire safety system 1 according to the invention is particularly suitable to be used in connection with hydrogen-propelled trains and to be usefully exploited when a train enters a confined space, such as a railway tunnel 110 illustrated in FIG. 2, and it will be described hereinafter by making a more specific reference to such applications, without intending in any way to limit its possible field of application and use.

In particular, as those skilled in the art would easily appreciate, the term transport vehicle 100 herein used can encompass any type of suitable transport vehicle which uses hydrogen stored on board as a source for its propulsion, or that carries on board a certain quantity of hydrogen stored in storage tanks, e.g. to be delivered for whatever suitable use; hence, such term may include for example, trains, trucks, cars, buses and the like.

As illustrated, the anti-fire safety system 1 according to the invention comprises at least:

a first hydrogen-releasing system which is configured, notably in case of a fire lapsing on board of the vehicle 100, to release outside the vehicle the gaseous hydrogen $H_2$ contained in and outflowing from at least one of the storage tanks 101 installed on board of the vehicle 100 itself; and a second release system which can intervene and bypass at least temporary any flow of hydrogen outflowing from the at least one storage tank 101 into the first hydrogen-releasing system, under one or more determined operative conditions.

In particular, in the anti-fire system 100 according to the invention, the second release system is configured to chemically transform at least a part of the bypassed gaseous hydrogen $H_2$ previously stored in at least one storage tank 101, into at least one different substance.

The intervention of the second release system with the consequent chemical transformation of stored hydrogen $H_2$ into at least one different substance can occur for example when intervening during a fire event on board of the vehicle.

According to a possible embodiment, the second release system is further configured to release outside the vehicle 100 the at least one different substance obtained via the chemical transformation.

As schematically illustrated in FIG. 1, and according to solutions per se known, each storage tank 101 installed on board of the vehicle 100 comprises one thermally activated pressure relief device 102; in turn, the first hydrogen-releasing system comprises a hydrogen releasing circuit 12 which interconnects each pressure relief device 102 with one or more venting points 14, towards which the flow of hydrogen $H_2$ leaving a tank 101 can be routed and discharged outside the vehicle 100 in case of a fire event.

As those skilled in the art can appreciated, in the first hydrogen-releasing system there could be provided one releasing circuit 12 and one or more venting points 14 common for all tanks 101 installed on board, or the releasing circuit 12 can comprise multiple independent conduits, each dedicated to interconnect a corresponding tank 101 to respective one or more venting points 14.

In a possible embodiment of the anti-fire safety system 1 according to the present invention, the second release system is configured to intervene and by-pass, at least temporary, the first hydrogen release system when the vehicle 100 enters into a closed or confined space 110, even if there is not yet a fire event on board of the vehicle. In this operative condition, the second release system is preventively activated to intervene and properly convey any flow of hydrogen $H_2$ that may occur when any fire laps on board.

With the definition of closed or confined space 110, it is hereby meant any space that is at least partially closed, such as railway or road tunnels, underground lines or roads, indoor parking lots, garages, et cetera.

According to a further embodiment, the second release system is configured to intervene and by-pass, at least temporary, the flow of hydrogen outflowing from at least one tank 101 inside the first hydrogen release system, when the vehicle 100 is inside a closed or confined space 110 and a fire alarm is generated while the vehicle 100 is still within the closed or confined space 110. Hence, in this operative conditions, the second release system intervenes only when a fire event occurs while the vehicle is in a closed or confined space.

According to yet a further possible embodiment, the second release system is configured to intervene and bypass, at least temporary, the flow of hydrogen $H_2$ outflowing from the at least one tank into the first hydrogen release system, in case of an on-board fire event and based on fire detectors which are proximate to one or more storage tanks 101 that are involved by the fire event. According to this embodiment, in certain operative conditions which can be selected based on specific needs/applications, such fire detectors can also activate the intervention of the second release system and thus the bypass of the first hydrogen release system, even if the vehicle is in open atmosphere in certain operative conditions.

In this case, hence, the second release system may optionally intervene even with a fire event occurring when the vehicle is in an open environment.

According to a possible embodiment illustrated in FIG. 1, the second releasing system comprises at least one catalyser 32 which is configured to chemically react with and transform at least a part of hydrogen $H_2$ flowing outside the at least one storage tank 101 into the at least one different substance.

In particular, in a possible embodiment of the anti-fire safety system 1, the at least one catalyser 32 is configured to chemically transform at least a part of hydrogen $H_2$ flowing outside the at least one storage tank 101 into water vapour $H_2O$, in particular hot or high temperature water vapour $H_2O$ and regular and control burning of mixed flow of hydrogen $H_2$ that react with air flow inside the catalyser.

For example, the catalyser 32 can be any suitable catalyser commercially available on the market, e.g. a metallic catalyser, wherein the chemical transformation of the flow of hydrogen occurs via redox chemical reactions.

The size of a catalyser 32 used, as well as the quantity of hydrogen to be transformed can be properly determined when designing the system 1 on the basis of the specific practical application.

According to this embodiment, the second release system further comprises at least:

a bypass circuit 34 which connects the at least one tank 101 with the at least one catalyser 32;

a by-pass valve 36, for example a pneumatically actuated valve, which is positioned along the bypass circuit 34;

and a control system 38 which is configured to switch the bypass valve 36 to convey the gaseous hydrogen $H_2$ flowing outside the at least one storage tank 101 towards the at least one catalyser 32, based for example on a fire alarm signal $S_{FIRE}$ received in input by any alarm device installed on board.

The control system 38 can be of concentrated or distributed type, and it can be constituted by, or comprise, any suitable processor-based device, e.g. a processor of a type commercially available, suitably programmed and provided or associated to the extent necessary with appropriate circuitry, in order to perform the functionalities devised according to and within the frame of the present invention.

In one embodiment of the anti-fire safety system 1, the second release system further comprises at least one buffer tank 40 which is positioned along the bypass circuit 34, in particular between the bypass valve 36 and the at least one catalyser 32.

Usefully, the at least one buffer tank 40 is configured to adjust the flow rate of hydrogen $H_2$ conveyed towards the catalyser 32.

The desired adjustment can be obtained for example via a suitable sizing of the buffer tank 40 and/or by associating the buffer tank 40 with one or more suitable flow regulating devices, which can be controlled for example by the control system 38.

Advantageously, the second release system comprises, for example, airflow sensors that optimize the air mixing of hydrogen and air inlet on the catalyser(s) to guarantee the best conversion performance.

According to a possible embodiment, the second release system further comprises a detecting device 42 which is configured to detect when the vehicle 100 enters or is located inside a closed or confined space 110.

For example, the detecting device 42 can comprise at least one or more of:

one or more pressure sensors which are installed on board of the vehicle 100 and are suitable to detect the pressure waves which are generated when a vehicle enters a tunnel or a similar confined structure, and to send corresponding signals $S_{DET}$ indicative of the vehicle entering into such confined space 110 to the control system 38; and/or one or more optical sensors also installed on board of a vehicle and capable of detecting when the vehicle has entered or is inside a confined space, such as a closed garage or an indoor parking lot, and to send corresponding signals $S_{DET}$ indicative of the actual position of vehicle inside the confined space 110 to the control system 38.

Clearly, other types of detecting devices may be used, such as image capturing devices, and any combination of different types of detecting devices can be implemented in the system 1 catalyser In practice, the control system 38 can output a command signal $S_c$ driving the commutation of the bypass valve 36, based on: only signals $S_{FIRE}$ received in input by any fire alarm device installed on board the vehicle 110, which are indicative of the presence of fire on board; or only on signals $S_{DET}$ received in input and issued by one or more detecting devices 42 indicating that the vehicle 100 has entered or is inside a confined or closed space 110; or only when both type of signals are received in input.

According to a further possible embodiment, the second release system further comprises at least one steam turbine 44 which is positioned downward the at least one catalyser 32 along a releasing path 46 along which the different substance generated via the catalyser 32 by means of the chemical transformation of the flow of hydrogen $H_2$, is routed for being released.

According to this embodiment, for example the water vapour $H_2O$ generated is not released immediately and directly outside the vehicle 110 but it is forced to pass through the steam turbine 44; in this way, the steam turbine 44 can produce power which can be used for instance to feed fans aimed at ventilating the surrounding ambient, thus contributing to reduce the temperature and improve the overall effectiveness of the anti-fire system 1.

Conveniently, the anti-fire safety system 1 according to the present invention, can be suitably scaled and adapted to the various applications, and especially to the various types of transport vehicles it is installed on.

In particular, for transport vehicles 100 having a plurality of storage tanks, as for example schematically represented in FIG. 1, the second release system comprises preferably a plurality of catalysers 32 which are connected, in parallel among each other, and each to a corresponding storage tank 101.

Each of such catalysers 32 can receive a corresponding flow of hydrogen and chemically transform it via a redox reaction, as described above.

Preferably according to the invention, the second release system comprises a corresponding plurality of buffer tanks 40; accordingly, each buffer tank 40 is connected upward an associated catalyser 32 and is configured to adjust the flow of hydrogen $H_2$ destined to pass through such associated catalyser 32.

According to this embodiment, the second release system can comprise a single bypass circuit 34 and a single bypass valve 36 common to and interconnecting all the storage tanks 101 each with a corresponding catalyser 32 of the plurality of catalysers 32; or there could be a dedicated bypass circuit 34 and an associated by-pass valve 36 connecting individually each storage tank 101 to a corresponding single catalyser 32.

In both cases, the or each bypass valve 36, and optionally also the or each buffer tank 40, can be controlled by a unique control system 38.

Hence, it is evident from the foregoing description that the anti-fire safe system 1 according to the present invention allows achieving the intended aim since it allows to improve the overall functioning and effectiveness of the on board anti-fire system equipping vehicles having hydrogen stored on board. The system 1 is especially useful if fires occur in closed or confined spaces; indeed, in such cases the chemical transformation of the gaseous hydrogen into another substance, such as water vapour, i.e. a less dangerous substance, allows to reduce conveniently the risk of generating highly hazardous conditions inside the closed or confined spaces.

In particular, the anti-fire system 1 as a whole has a kind of modular composition where a first releasing system can be used in certain operative conditions, and in particular when a fire event occurs in open spaces, and a complementary second releasing system which can be selectively and properly activated ad hoc, in a way that can be properly tailored. For example, the second releasing system can be configured so that the control system 38 can actuate the bypass valve 36, thus bypassing the first releasing system, when entering or being in a closed or confined space even if there is not a fire event on board, only when the vehicle is in a closed or confined space and there is at the same time a fire event on board, or even when there is a fire event and the vehicle is in an open environment and the intervention of the second release system may be anyhow suitable and appropriate.

The anti-fire safety system 1 thus conceived is susceptible of modifications and variations, all of which are within the scope of the inventive concept as defined in particular by the appended claims, and contemplates any possible combination of the embodiments or parts thereof hereinbefore described; for example, in relation to the specific application, some of the components or parts described, can be shaped or positioned differently from what described, or there could be a number of components different from that described.

All the details may furthermore be replaced with technically equivalent elements.

What is claimed is:

1. An anti-fire safety system for a transport vehicle having one or more storage tanks storing hydrogen, wherein the anti-fire safety system comprises at least:
    a first hydrogen-releasing system which is configured to release hydrogen outside at least one of said one or more storage tanks; and
    a second release system which is arranged to intervene and bypass the first hydrogen release system under predetermined operative conditions, wherein the second release system is configured to transform by a chemical reaction, at least a part of bypassed hydrogen flowing outward from said at least one of said one or more storage tanks, into at least one different substance.

2. The anti-fire safety system according to claim 1, wherein said second release system is configured to release outside the vehicle the at least one different substance obtained through the chemical reaction.

3. The anti-fire safety system according to claim 1, wherein said second release system is configured to intervene and bypass, at least temporary, said first hydrogen release system when the vehicle enters into or is inside a closed or confined space.

4. The anti-fire safety system according to claim 3, wherein said second release system is configured to bypassby, at least temporary, said first hydrogen release system, when the vehicle enters said closed or confined space and a fire alarm is generated on board of vehicle while the vehicle is still within the closed or confined space.

5. The anti-fire safety system according to claim 1, wherein said second release system is configured to intervene and bypass at least temporary said first hydrogen release system in case of a fire event on board of the vehicle.

6. The anti-fire safety system according to claim 1, wherein said second release system comprises at least one catalyser suitable to chemically react with and transform at least a part of hydrogen flowing outside the at least one storage tank into said at least one different substance.

7. The anti-fire safety system according to claim 6, wherein said at least one catalyser is configured to chemically transform at least a part of hydrogen flowing outside the at least one storage tank into water vapors and control burning of mixed flow of hydrogen that react with air flow inside the catalyser.

8. The anti-fire safety system according to claim 6, wherein said second release system further comprises at least a bypass circuit connecting the at least one tank with said at least one catalyser, a bypass valve positioned along the bypass circuit and a control system which is configured to switch said bypass valve to convey hydrogen flowing outside the at least one storage tank towards the at least one catalyser.

9. The anti-fire safety system according to claim 6, wherein said second release system further comprises at least one buffer tank which is positioned upward the at least one catalyser and is configured to adjust the flow of hydrogen conveyed towards the catalyser.

10. The anti-fire safety system according to claim 1, wherein said second release system further comprises a detecting device configured to detect when the vehicle enters or is located inside a closed or confined space.

11. The anti-fire safety system according to claim 10, wherein said detecting device comprises at least one pressure sensor and/or at least one optical sensor.

12. The anti-fire safety system according to claim 6, wherein said second release system further comprises at least one steam turbine which is positioned downward the at least one catalyser along a releasing path adapted to be traversed by the flow of the different substance generated via the catalyser.

13. The anti-fire safety system according to claim 6, wherein said second release system comprises a plurality of catalysers which are connected, in parallel among each other, and each to a corresponding storage tank of said one or more storage tanks.

14. A transport vehicle comprising one or more storage tanks for storing hydrogen, wherein the transport vehicle further comprises an anti-fire system according to claim 1.

15. The transport vehicle according to claim 14, wherein the transport vehicle is a hydrogen-propelled vehicle.

16. The transport vehicle according to claim 14, wherein the transport vehicle is a hydrogen-propelled railway vehicle.

* * * * *